US012597049B2

(12) United States Patent
Kusunoki et al.

(10) Patent No.: US 12,597,049 B2
(45) Date of Patent: Apr. 7, 2026

(54) INFORMATION PROCESSING SYSTEM, METHOD OF DETERMINING PRODUCT, AND COMPUTER-READABLE RECORDING MEDIUM STORING CONTROL PROGRAM

(71) Applicant: KONICA MINOLTA, INC., Tokyo (JP)

(72) Inventors: Takahiro Kusunoki, Hino (JP); Toshiaki Miyaki, Yokohama (JP); Takashi Fujiwara, Koganei (JP); Masahiro Yamaguchi, Tachikawa (JP); Toshiyuki Tsukahara, Yokohama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/425,718

(22) Filed: Jan. 29, 2024

(65) Prior Publication Data

US 2024/0303688 A1 Sep. 12, 2024

(30) Foreign Application Priority Data

Mar. 9, 2023 (JP) ................................ 2023-036447

(51) Int. Cl.
*G06Q 30/02* (2023.01)
*G06Q 30/0242* (2023.01)
*G06Q 30/0251* (2023.01)
(52) U.S. Cl.
CPC ..... *G06Q 30/0242* (2013.01); *G06Q 30/0255* (2013.01)

(58) Field of Classification Search
CPC .......... G06Q 30/0242; G06Q 30/0255; G06Q 30/02; G06Q 30/0207–30/0277
See application file for complete search history.

(56) References Cited

U.S. PATENT DOCUMENTS

| | | | | |
|---|---|---|---|---|
| 2008/0313035 | A1* | 12/2008 | Peeters .............. | G06Q 30/0251 705/14.71 |
| 2010/0088178 | A1* | 4/2010 | Gnanasambandam ...................... | G06Q 30/0251 705/14.49 |
| 2013/0325636 | A1* | 12/2013 | Carter ................ | G06Q 30/0277 705/14.71 |
| 2014/0278789 | A1* | 9/2014 | Singh ................. | G06Q 30/0203 705/7.32 |
| 2015/0102100 | A1* | 4/2015 | Hattrup .............. | G06K 15/1835 53/64 |
| 2015/0116733 | A1* | 4/2015 | Takada ............... | H04N 1/00347 358/3.28 |
| 2017/0193568 | A1* | 7/2017 | Pattabiraman ..... | G06Q 30/0641 |
| 2019/0265873 | A1* | 8/2019 | Kim ........................ | G06F 3/017 |

(Continued)

FOREIGN PATENT DOCUMENTS

| | | | |
|---|---|---|---|
| JP | 6927392 B1 * | 8/2020 | |
| JP | 2022111909 A | 8/2022 | |

*Primary Examiner* — Thuy N Nguyen
(74) *Attorney, Agent, or Firm* — Buchanan Ingersoll & Rooney PC

(57) ABSTRACT
An information processing system includes: an acquirer that acquires first information relating to an advertisement; a determiner that determines, based on the acquired first information, whether or not to create a product to be created by an image forming apparatus as a product of which an advertising effect of the advertisement can be measured; and an output section that outputs a result of the determination.

10 Claims, 9 Drawing Sheets

ENCODING OF URL http://r.qrqrq.com/12345x

(56)  References Cited

U.S. PATENT DOCUMENTS

| | | | |
|---|---|---|---|
| 2019/0281124 A1* | 9/2019 | Lim | G06Q 30/0207 |
| 2021/0357974 A1* | 11/2021 | Okamoto | G09F 3/0297 |
| 2022/0038757 A1* | 2/2022 | Ghavami | H04N 21/458 |
| 2024/0127295 A1* | 4/2024 | Matsushima | G06F 16/9566 |

* cited by examiner

ENCODING OF
URL http://r.qrqrq.com/12345x

| CUSTOMER NO. | NUMBER OF DAYS ELAPSED FROM DATE OF LAST PURCHASE | TARGET OF ADVERTISING EFFECT MEASUREMENT |
|---|---|---|
| 1 | WITHIN ONE MONTH | YES |
| 2 | WITHIN HALF A YEAR (MORE THAN ONE MONTH) | NO |
| 3 | WITHIN ONE YEAR (MORE THAN HALF A YEAR) | NO |
| 4 | MORE THAN ONE YEAR (MORE THAN HALF A YEAR) | NO |
| 5 | WITHIN ONE MONTH | YES |
| 6 | WITHIN ONE MONTH | YES |
| 7 | WITHIN ONE MONTH | YES |
| 8 | WITHIN HALF A YEAR (MORE THAN ONE MONTH) | NO |
| 9 | MORE THAN ONE YEAR | NO |
| 10 | MORE THAN ONE YEAR (MORE THAN HALF A YEAR) | NO |
| ...... | ...... | ...... |
| 9001 | *** | *** |
| ...... | ...... | ...... |

FIG. 5B

| CUSTOMER NO. | NUMBER OF TIMES OF USE | TARGET OF ADVERTISING EFFECT MEASUREMENT |
|---|---|---|
| 1 | TWO OR MORE TIMES | NO |
| 2 | TWO OR MORE TIMES | NO |
| 3 | TWO OR MORE TIMES | NO |
| 4 | ONE TIME | YES |
| 5 | ONE TIME | YES |
| 6 | ONE TIME | YES |
| 7 | TWO OR MORE TIMES | NO |
| 8 | TWO OR MORE TIMES | NO |
| 9 | TWO OR MORE TIMES | NO |
| 10 | TWO OR MORE TIMES | NO |
| ...... | ...... | ...... |
| 9001 | *** | *** |
| ...... | ...... | ...... |

*FIG. 6* d1, 30

| CUSTOMER NO. | PRINT INFORMATION FOR ADVERTISING EFFECT MEASUREMENT |
|---|---|
| 1 | PROVIDED |
| 2 | NOT PROVIDED |
| 3 | NOT PROVIDED |
| 4 | PROVIDED |
| 5 | NOT PROVIDED |
| 6 | NOT PROVIDED |
| 7 | PROVIDED |
| 8 | PROVIDED |
| ...... | ...... |

*FIG. 7*

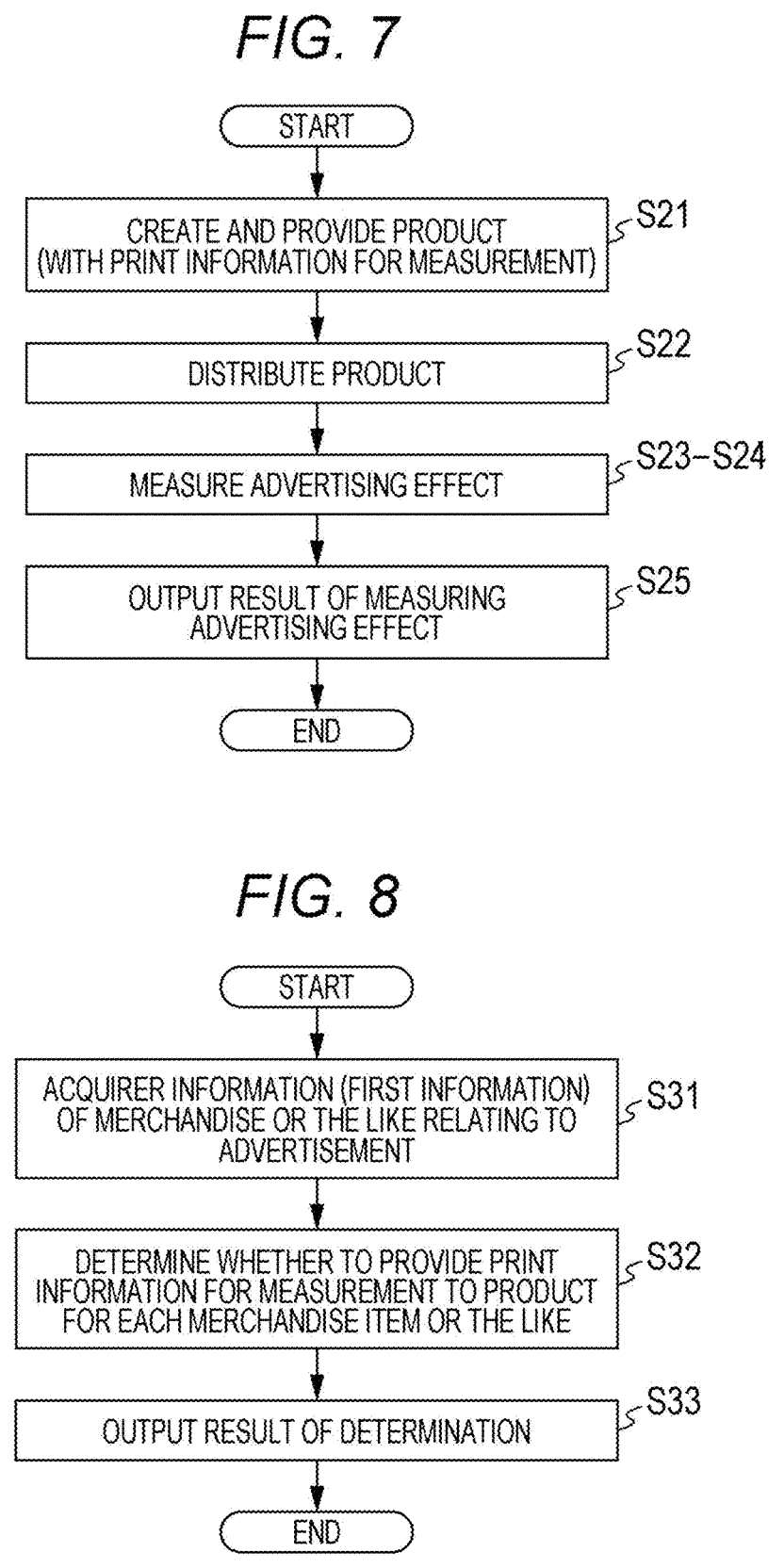

START

CREATE AND PROVIDE PRODUCT
(WITH PRINT INFORMATION FOR MEASUREMENT) ⟋S21

DISTRIBUTE PRODUCT ⟋S22

MEASURE ADVERTISING EFFECT ⟋S23~S24

OUTPUT RESULT OF MEASURING
ADVERTISING EFFECT ⟋S25

END

*FIG. 8*

START

ACQUIRER INFORMATION (FIRST INFORMATION)
OF MERCHANDISE OR THE LIKE RELATING TO
ADVERTISEMENT ⟋S31

DETERMINE WHETHER TO PROVIDE PRINT
INFORMATION FOR MEASUREMENT TO PRODUCT
FOR EACH MERCHANDISE ITEM OR THE LIKE ⟋S32

OUTPUT RESULT OF DETERMINATION ⟋S33

END

FIG. 9A

| MERCHANDISE NO. | PRICE OF MERCHANDISE | TARGET OF ADVERTISING EFFECT MEASUREMENT |
|---|---|---|
| 1 | 10,000 YEN OR MORE | YES |
| 2 | LESS THAN 10,000 YEN | NO |
| ...... | ...... | ...... |

FIG. 9B

| MERCHANDISE NO. | USAGE SYSTEM | TARGET OF ADVERTISING EFFECT MEASUREMENT |
|---|---|---|
| 1 | SUBSCRIPTION | YES |
| 2 | SELLOUT | NO |
| ...... | ...... | ...... |

FIG. 10 d2, 30

MERCHANDISE NO.1

IT IS RECOMMENDED TO PERFORM PRINTING WHILE PROVIDING URL FOR ADVERTISING EFFECT MEASUREMENT USING DIGITAL PRINTING MACHINE.

INFORMATION PROCESSING SYSTEM, METHOD OF DETERMINING PRODUCT, AND COMPUTER-READABLE RECORDING MEDIUM STORING CONTROL PROGRAM

CROSS-REFERENCE TO RELATED APPLICATION

The entire disclosure of Japanese patent application No. 2023-036447, filed on Mar. 9, 2023, is incorporated herein by reference in its entirety.

BACKGROUND OF THE INVENTION

1. Technical Field

The present invention relates to an information processing system, a method of determining a product, and a computer-readable recording medium storing a control program.

2. Description of Related Art

Conventionally, a brand owner that wants to promote merchandise or the like causes creation of a product for the purpose of promoting the merchandise, and sends the product to consumers by direct messages or distributes the product at an exhibition hall. However, it is difficult to grasp the degree of the advertising effect of the product only by distributing the product.

Japanese Unexamined Patent Application Publication No. 2002-111909 discloses "an information providing service in which a two-dimensional code indicating advertisement content identification information for identifying advertisement content and connection information is printed on an advertisement medium, a portable communication terminal accesses a server based on the connection information indicated by the two-dimensional code by reading the two-dimensional code by reading means to transmit the advertisement content identification information indicated by the two-dimensional code to the server, and the server transmits new advertisement information to the portable communication terminal based on the advertisement content identification information transmitted from the portable communication terminal and aggregates the effect of the advertisement based on the advertisement content identification information".

SUMMARY OF THE INVENTION

However, there are cases where the effect of the advertisement does not need to be aggregated depending on the advertisement content or a target person to whom the advertisement is distributed, and in such a case, it is simpler and more inexpensive to perform printing by an analog printing machine without printing the two-dimensional code. Therefore, appropriate determination is required in consideration of the advertisement content and the situation of the target person to whom the advertisement is distributed.

The present invention has been made in view of the above circumstances, and an object of the present invention is to appropriately determine, based on information relating to an advertisement, whether to produce a product to which print information with which an advertising effect can be measured is given.

To achieve at least one of the abovementioned objects, according to an aspect of the present invention, a system reflecting one aspect of the present inventions comprises the followings.

An information processing system including:

an acquirer that acquires first information relating to an advertisement;

a determiner that determines, based on the acquired first information, whether or not to create a product to be created by an image forming apparatus as a product of which an advertising effect of the advertisement can be measured; and an output section that outputs a result of the determination in the determiner.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5A illustrates an example of a case where information relating to an elapsed time from past purchase by a distribution target person is used as the first information;

FIG. 5B illustrates an example of a case where the number of times of use by the distribution target person is used as the first information;

FIG. 6 illustrates an example of output of a determination result;

FIG. 7 is a flowchart illustrating a process of measuring an advertising effect using a product to which print information for measurement is given;

FIG. 8 is a flowchart illustrating a process of determining, based on first information relating to an advertisement, whether to give print information for measurement in a modification example;

FIG. 9A illustrates an example of a case where a price of merchandise to be advertised is used as the first information;

FIG. 9B illustrates an example of a case where a usage system of a service to be advertised is used as the first information;

FIG. 10 illustrates an example of output of a determination result;

DETAILED DESCRIPTION

Figure 1:
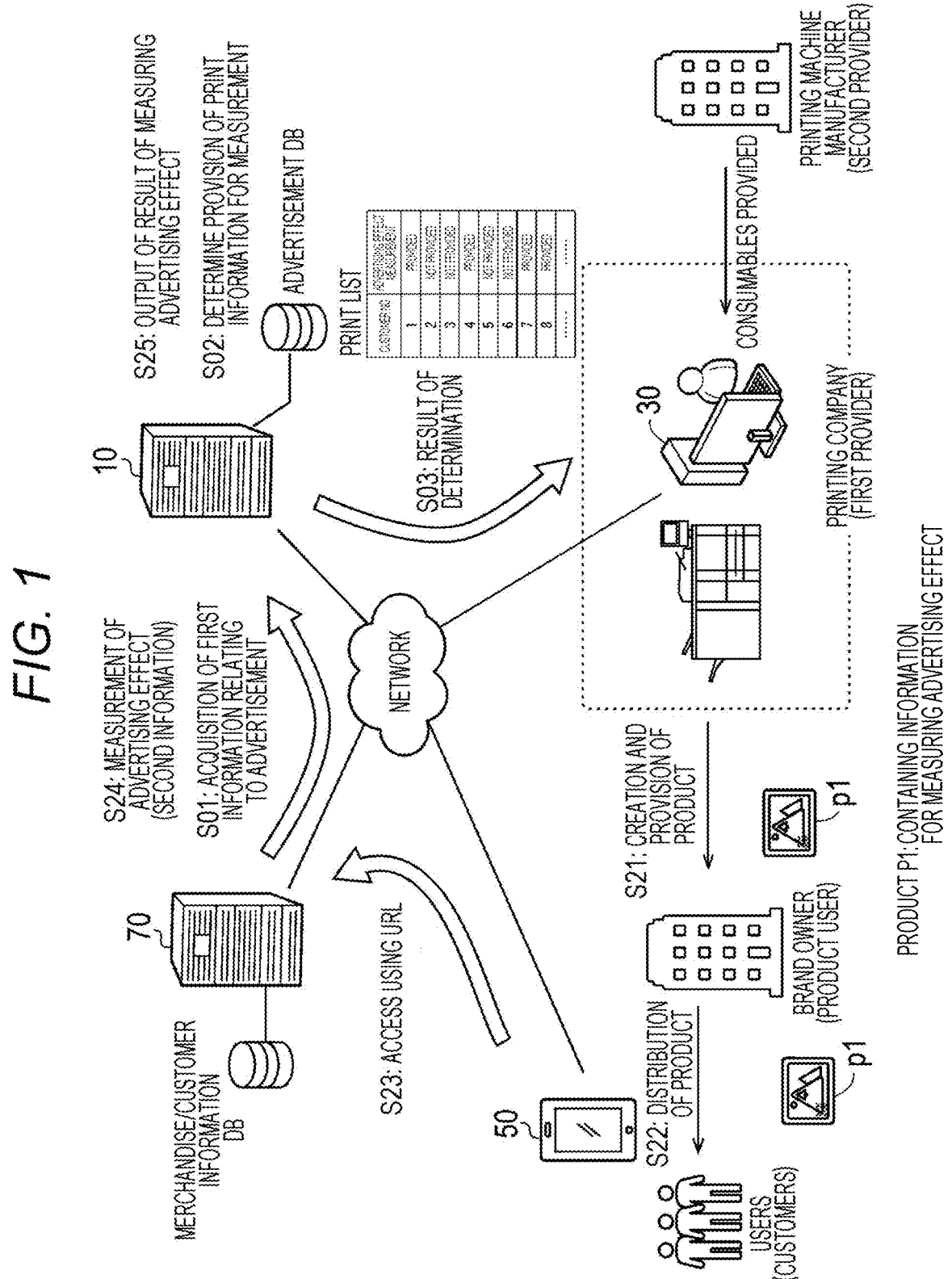
FIG. 1 is a schematic diagram illustrating a procedure of a process in a market to which an information processing system according to a first embodiment is applied.

Hereinafter, embodiments of the present invention will be described with reference to the accompanying drawings. However, the scope of the present invention is not limited to the disclosed embodiments. In the description of the drawings, the same components are denoted by the same reference signs, and redundant descriptions are omitted. In addition, dimensional ratios in the drawings are exaggerated for convenience of description and may be different from actual ratios.

FIG. 1 is a schematic diagram illustrating a procedure of a process in a market to which an information processing system 10 according to a first embodiment is applied.

As illustrated in FIG. 1, the information processing system 10 is communicably connected to terminal devices 30 and 50, a web server 70, and the like via a network. The network is a communication line such as a public telephone network or a data communication network. In some networks, a wired LAN, a wireless LAN, or the like (for example, a LAN conforming to the standard IEEE802.11) may be used.

The terminal devices 30 and 50 are personal computers (PCs) or portable communication terminals such as smartphones. For example, the terminal device 30 is a PC located in a printing company, and is used by a user of the printing company. For example, the terminal device 50 is a smartphone with a camera function that is used by a user. The user is also referred to as a customer or a consumer, and purchases merchandise provided by a brand owner or uses a service provided by the brand owner. The brand owner is a business entity that sells merchandise to users or provides services such as seminars, training, and events (hereinafter, these are referred to as seminars or the like) to the users, and is also an advertiser.

The brand owner distributes (hands over, sends direct mail (DM)) a product for advertisement to a user in order to advertise merchandise or service (hereinafter, referred to as merchandise or the like) to the user.

In response to a request from a customer such as the brand owner, the printing company creates a product p1 to which information for advertising effect measurement is given or a product to which the information is not given, and provides the created product to the customer. For example, one hundred to several hundred thousand products p1 are created in one lot (which refers to an order unit, the same applies hereinafter). The product p1 is, for example, promotion paper printed on a cut sheet or a poster printed on a large-size sheet. An image forming apparatus used by the printing company includes an analog printing machine that performs mass printing by creating a plate for an offset printing method or the like, and a digital printing machine using a method such as an electrophotographic method or an inkjet method.

The printing company creates the product p1 in response to a request from a customer such as the brand owner and provides the customer with the product. For example, one hundred to several hundred thousand products p1 are created in one lot (which refers to an order unit, the same applies hereinafter). The product p1 is, for example, promotion paper printed on a cut sheet or a poster printed on a large-size sheet. An image forming apparatus used by the printing company includes an analog printing machine that performs mass printing by creating a plate for an offset printing method or the like, and a digital printing machine using a method such as an electrophotographic method or an inkjet method.

A printing machine manufacturer provides the digital printing machine to the printing company, and also provides consumables of the digital printing machine to the printing company. In a case where the digital printing machine is a digital printing machine that uses an electrophotographic method, the consumables include toner. In a case where the digital printing machine is an inkjet digital printing machine, the consumables include ink.

In a procedure of creating and providing the product p1 illustrated in FIG. 1, the brand owner is a product user. The printing company is a provider (hereinafter, also referred to as a first provider) that provides a product to the brand owner in response to a request from the brand owner. The printing machine manufacturer is a provider (hereinafter, also referred to as a second provider) that provides the printing machine itself or provides consumables for the product p1 in response to a request from or a contract with the printing company.

(Print Information for Advertising Effect Measurement)

Figure 2:
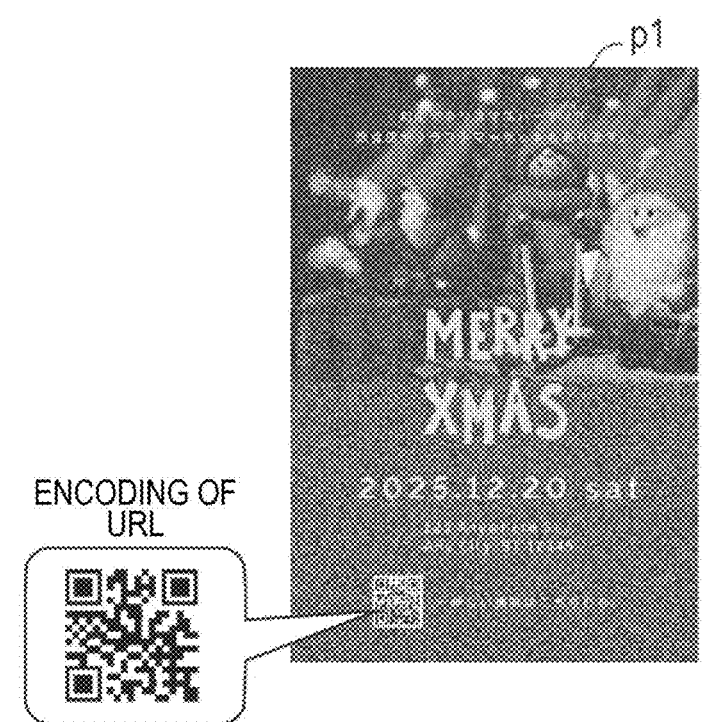
FIG. 2 illustrates an example of a product for advertisement to which a two-dimensional code obtained by encoding a URL of a web page is given as information for advertising effect measurement.

Print information for advertising effect measurement includes a two-dimensional code obtained by encoding a URL, or the URL itself. FIG. 2 illustrates an example of a product p1 for advertisement to which a two-dimensional code obtained by encoding a uniform resource locator (URL) of a web page is given (printed) as an example of information (hereinafter, also simply referred to as print information for measurement or print information) for advertising effect measurement. The brand owner receives such a product p1 from the printing company and distributes the product p1 to a user. The user can access the web page specified by the URL via the two-dimensional code provided to the product p1. For example, the terminal device 50 reads the two-dimensional code with the camera function, decodes the two-dimensional code to obtain the URL, and accesses the web server 70 using the URL to obtain the web page. This web page is a web page for merchandise purchase or a web page showing detailed information of merchandise in a case where the product for advertisement relates to merchandise purchase. Alternatively, in a case where the product for advertisement relates to a service such as a seminar or training, the web page is a web page for application of the seminar or training or a web page showing detailed information of the service.

Basically, a two-dimensional code of the same URL is printed on products (for example, 100,000 sheets) of one lot. In addition, products p1 of a plurality of lots may be created in order to provide, at different times, products of the same content or substantially the same product in which the same merchandise or the like is an advertisement target. In this case, a two-dimensional code of a different URL may be given to a product p1 for each lot. Note that in one lot, in order that users can be identified, two-dimensional codes of different URLs may be printed so that each user can access a different web page (examples of FIGS. 5A and 5B described later).

The web server 70 may be a web server managed by the brand owner, or may be a web server managed by a client to which the brand owner outsources the management. When the web server 70 is accessed by a user (customer) via the two-dimensional code given to the product p1, the web server 70 counts the number of times of access. In this case, the web server 70 may identify the user. For example, after accessing the web server 70, the user inputs a user ID.

Alternatively, by performing user authentication and login processing using this user ID, the web server 70 may identify the individual and count access for each individual. Furthermore, even if a two-dimensional code with a URL that is different for each user to whom the two-dimensional code is distributed is printed, access can be similarly counted for each individual.

Information on the counted number is provided to the information processing system 10 as an index value (also referred to as second information) relating to the advertising effect and is used for measurement of the advertising effect. (Information Processing System 10)

Figure 3:
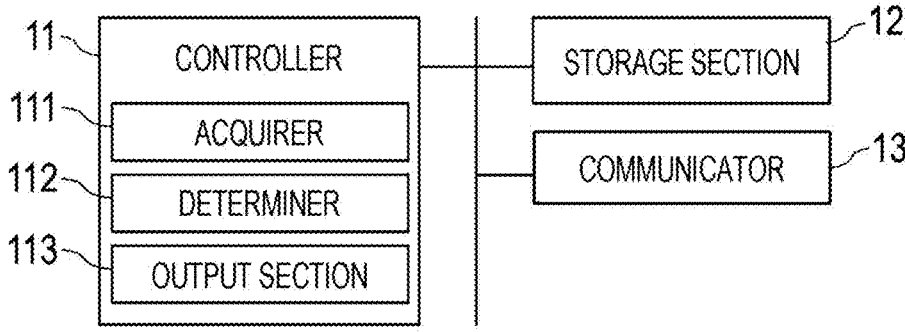
FIG. 3 is a block diagram illustrating a schematic configuration of the information processing system.

FIG. 3 is a block diagram illustrating a schematic configuration of the information processing system 10. The information processing system 10 includes a controller 11, a storage section 12, and a communicator 13. The information processing system 10 may be, for example, an on-premise server on the premises of any of the companies of the product user, the first provider, and the second provider. Alternatively, the information processing system 10 may be a cloud server using a commercial cloud service. (Controller 11)

The controller 11 includes a CPU and memories such as a RAM and a ROM. The CPU is a control circuit constituted by a multi-core processor or the like that executes control of the above-described sections and various kinds of arithmetic processing in accordance with a program. Each function of the information processing system 10 is implemented by the CPU executing a program corresponding to the function. Further, the controller 11 functions as an acquirer 111 and an output section 113 by cooperating with the communicator 13. The controller 11 also functions as a determiner 112.

The storage section 12 is a large-capacity auxiliary storage device that stores various programs including an operating system and various types of data. As the storage, for example, a hard disk, a solid state drive, a flash memory, a ROM, or the like is used. The storage section stores, as an advertisement DB, first information (described later) acquired by the acquirer. (Communicator 13)

The communicator 13 has a communication function, and is also an interface for network connection to an external device such as a PC. (Acquirer 111)

The acquirer 111 receives an input of the first information relating to an advertisement from the web server 70 and acquires the first information. Specific examples of the first information will be described later (FIGS. 5A, 5B, 9A, 9B, and the like described later). (Determiner 112 and Output Section 113)

The determiner 112 determines, based on the first information relating to the advertisement and acquired by the acquirer 111, whether or not to create the product to be created by the image forming apparatus as a product of which the advertising effect of the advertisement can be measured. That is, the determiner 112 determines whether or not to provide the product p1 with the print information for advertising effect measurement. Further, the output section 113 outputs a result of the determination.

The first information relating to the advertisement is, for example, information relating to a distribution target person to which the advertisement is to be distributed, or information relating to merchandise or a service that is to be advertised. For example, in a case where the merchandise or the service is to be advertised, the determination is made in accordance with the number of times of use (the number of times of purchase, the number of times of provision) by the distribution target person. Furthermore, the determination is made according to the number of elapsed days since the last purchase of the merchandise or the last provision of the service. In a case where the number of times of use is equal to or less than a predetermined value, or in a case where the number of elapsed days is shorter than a predetermined period, it is determined to create a product of which the advertising effect can be measured. Alternatively, in a case where the price of the merchandise is higher than a predetermined amount of money, or in a case where the service is subscription (represented by subscription), the determiner 112 determines to create a product of which the advertising effect can be measured. The result of the determination is display data, which is transmitted, for example, from the information processing system 10 to the printing company or the brand owner and is displayed. In the example illustrated in FIG. 1, the result of the determination is transmitted to the terminal device 30 at the printing company and is displayed.

Figure 4:
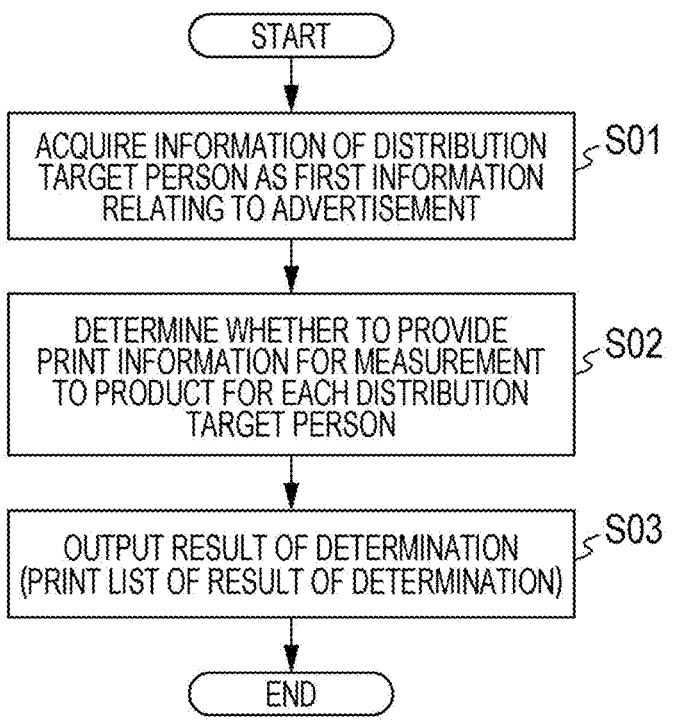
FIG. 4 is a flowchart illustrating a process of determining whether or not to give print information for measurement based on first information relating to an advertisement in the first embodiment.

(Determination Relating to Provision of Print Information for Advertising Effect Measurement) FIG. 4 is a flowchart illustrating a process of determining, by the information processing system 10, whether or not to give the print information for measurement based on the first information relating to the advertisement in the first embodiment. Processing numbers (step S01 and the like) illustrated in FIG. 4 correspond to processing numbers illustrated in FIG. 1 (the same applies to FIG. 7 described later). (Step S01)

The acquirer 111 of the information processing system 10 acquires information of a distribution target person (customer) as the first information relating to the advertisement in a case where a product for the advertisement is printed. (Step S02)

The determiner 112 determines, for each distribution target person, whether to provide print information for measurement based on the information of the distribution target person (customer).

FIG. 5A illustrates an example of a case where information relating to an elapsed time from past purchase by the distribution target person is used as the first information. FIG. 5A illustrates the number of elapsed days from a date of the last purchase of merchandise of each of n (for example, 10,000) customers in a customer list in a merchandise/customer information database (DB). When the elapsed time is equal to or less than a predetermined value (for example, one month), the determiner 112 determines that the print information is to be provided. That is, the determiner 112 determines that the person is to be a target of the advertising effect measurement. In the example illustrated in FIG. 5A, customers with customer numbers 1 and 5 to 7 are determined to be targets of the advertising effect measurement because days elapsed from the last purchase by each of the customers are within one month (the customers are represented by circles, the same applies hereinafter). In addition, since the number of days elapsed from the last purchase by each of customers with customer numbers 2 to 4 and 8 to 10 is not within one month, it is determined that the customers are not targets for the advertising effect measurement (the customers are represented by crosses, the same applies hereinafter).

FIG. 5B illustrates an example of a case where information relating to the number of times of use of a service by a distribution target person is used as another example of the first information. FIG. 5B illustrates the number of times of use of the service (or the number of times of purchase of merchandise) by each of n customers in the customer list in the merchandise/customer information DB. When the number of times of use is equal to or more than a predetermined value (for example, 2 times), the determiner 112 determines that the print information is to be provided. That is, the determiner 112 determines that the person is to be a target of the advertising effect measurement. In the example illustrated in FIG. 5B, customers with customer numbers 1 and 5 to 7 are determined as targets of the advertising effect measurement because the number of times of use of the service by each of the customers is equal to or more than the predetermined value that is 2 times. In addition, since the number of days elapsed from the last purchase by each of customers with customer numbers 2 to 4 and 8 to 10 is not within one month, and thus the customers are determined not to be targets of the advertising effect measurement.

(Step S03)

The output section 113 outputs a result of the determination in step S02. This output may be displayed on a display section (not illustrated) of the information processing system 10, or may be transmitted to an external device and displayed on the external device. FIG. 6 illustrates an example of a display screen d1 displayed on a display section (not illustrated) of the terminal device 30 when the output section 113 transmits display data to the terminal device 30 which is an external device. In FIG. 6, although only customer numbers up to customer number 8 are displayed, individual determination results for all of target customers (for example, 10,000 persons) are scrollably displayed. Note that as the display, the number of persons to whom the print information for measurement is to be provided and the number of persons to whom the print information is not to be provided may be displayed. Furthermore, this display may be presented to the brand owner. With reference to this display, the printing company or the brand owner can appropriately determine, based on the information relating to the advertisement, whether to produce a product to which print information with which the advertising effect can be measured is given. In addition, the printing company having the analog printing machine and the digital printing machine is motivated to use the digital printing machine to generate a product p1 to which print information for measurement is given. In addition, advertisement of merchandise using the product is activated.

(Processing of Measuring Advertising Effect Using Product to which Print Information for Measurement is Given)

FIG. 7 is a flowchart illustrating a process of measuring an advertising effect using a product to which print information for measurement is given.

(Step S21)

The printing company creates the product p1 for a customer determined to be a target of advertising effect measurement based on a print list as illustrated in FIG. 6, and provides the product p1 to the brand owner. In this case, the printing company may also deliver the print list.

(Step S22)

The brand owner distributes the product p1 to a customer who is a target in the print list (hand delivery, DM).

(Steps S23 and S24)

The customer reads and decodes the two-dimensional code by the camera function of the terminal device 50 to acquire the URL, and accesses the web server 70 via the URL. The web server 70 measures the advertising effect by counting the number of times of access (more specifically, the number of times of access to the web page linked to the URL specified by the print information, the same applies hereinafter).

(Step S25)

The information processing system 10 outputs the result of the advertising effect measurement. For example, the information processing system 10 transmits the result of the advertising effect measurement to the brand owner. In this way, the product p1 is provided with the print information for advertising effect measurement, so that the brand owner can grasp the advertising effect.

Modification Examples

Next, modification examples will be described with reference to FIGS. 8 to 10.

FIG. 8 is a flowchart illustrating a process of determining, based on first information relating to an advertisement, whether to give print information for measurement in a modification example.

(Step S31)

To print a product for an advertisement, the acquirer 111 of the information processing system 10 acquires information of merchandise or the like as the first information relating to the advertisement.

(Step S32)

The determiner 112 determines, for each lot, whether or not to provide print information for measurement, based on the information of the merchandise or the like.

FIG. 9A illustrates an example of a case where information relating to prices of merchandise is used as the first information. FIG. 9A illustrates the prices of the merchandise in a merchandise list in a merchandise/customer information database (DB). The determiner 112 determines that the print information is given as the first information when information of merchandise and prices of the merchandise equal to or larger than a predetermined value (for example. 10,000 yen or more) is acquired. That is, the determiner 112 determines that the merchandise is a target of the advertising effect measurement. In the example illustrated in FIG. 9A, when a product for advertisement relating to merchandise with merchandise number 1 is to be printed, the price is 10,000 yen or more, and thus the merchandise is determined to be a target of the advertising effect measurement. On the other hand, when a product for advertisement relating to merchandise with merchandise number 2 is to be printed, it is determined that the merchandise is not a target of the advertising effect measurement because the price is less than 10,000 yen.

FIG. 9B illustrates an example of a case where information relating to a usage system of merchandise is used as the first information. FIG. 9B illustrates a usage system of merchandise in a merchandise list in a merchandise/customer information database (DB). In a case where the usage system of the merchandise is subscription (for example, monthly periodic purchase), the determiner 112 determines that print information is to be provided when a product for advertisement is to be printed. In the case of sellout (for example, purchase each time), the determiner 112 determines not to provide the print information. In the example illustrated in FIG. 9B, when a product for advertisement relating to the merchandise with merchandise number 1 is to be printed, the merchandise is determined to be a target of the advertising effect measurement because the usage system is subscription. On the other hand, when a product for advertisement relating to the merchandise with merchandise number 2 is to be printed, the merchandise is determined not to be a target of the advertising effect measurement because the usage system is sellout.

(Step S33)

The output section 113 outputs a result of the determination in step S02. This output may be displayed on the display section (not illustrated) of the information processing system 10 as an output destination, or may be transmitted to an external device and displayed on the external device. FIG. 10 illustrates an example of a display screen d2 displayed on the display section (not illustrated) of the terminal device 30 when the output section 113 transmits display data to the terminal device 30 which is an external device. In the example illustrated in FIG. 10, information indicating that it is recommended to perform printing while providing a URL for advertising effect measurement using the digital printing machine is presented to the brand owner or the printing company. With reference to this display, the printing company or the brand owner can appropriately determine, based on the information relating to the advertisement, whether to produce a product to which print information with which the advertising effect can be measured is given. Furthermore, the printing company or the brand owner motivates the product user (brand owner) to use the digital printing machine according to the displayed recommendation information. In addition, advertisement of merchandise using the product is activated.

(Information Processing System 10b According to Second Embodiment)

Figure 11:
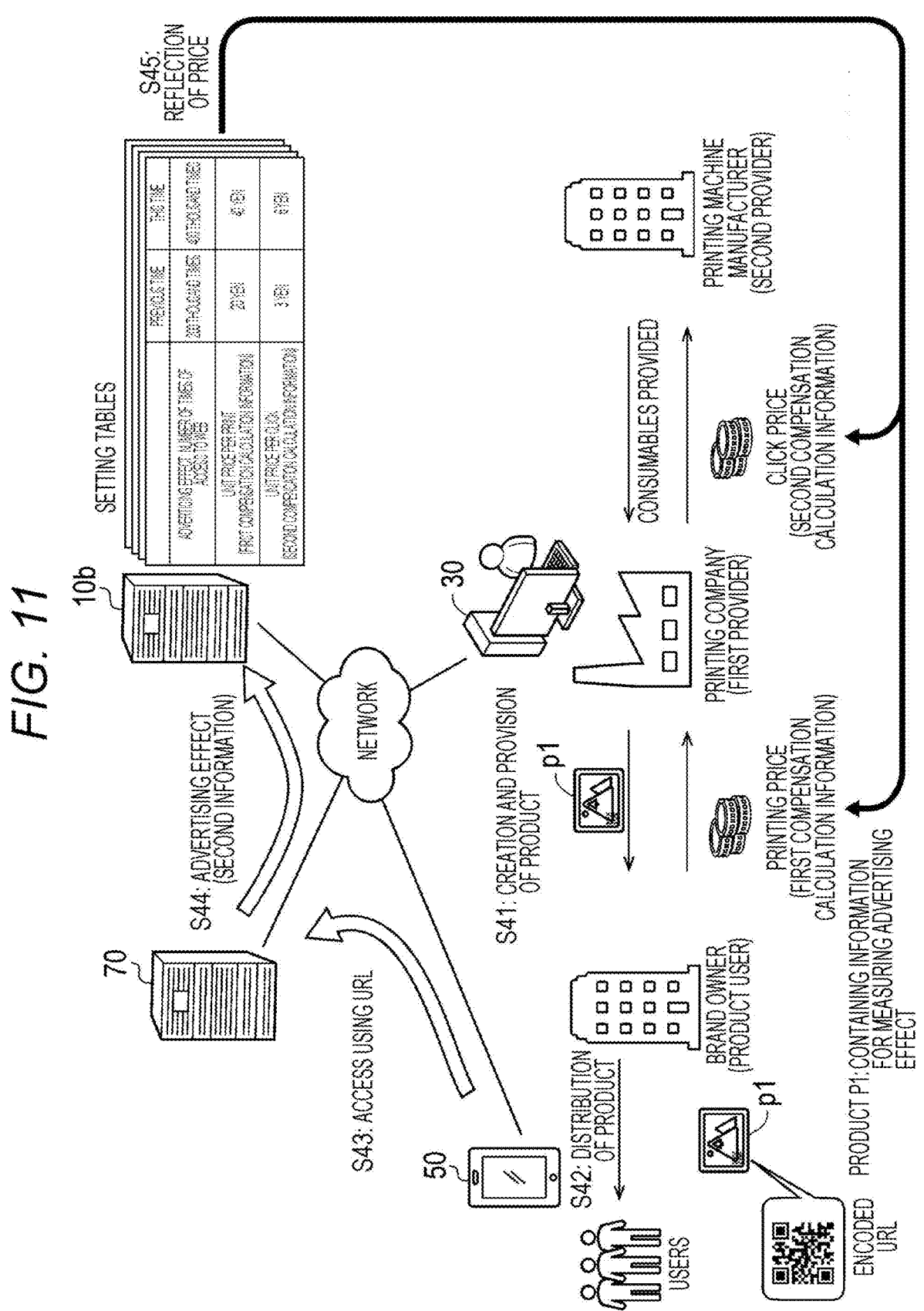
FIG. 11 is a schematic diagram illustrating a procedure of a process in a market to which an information processing system according to a second embodiment is applied.
Figure 12:
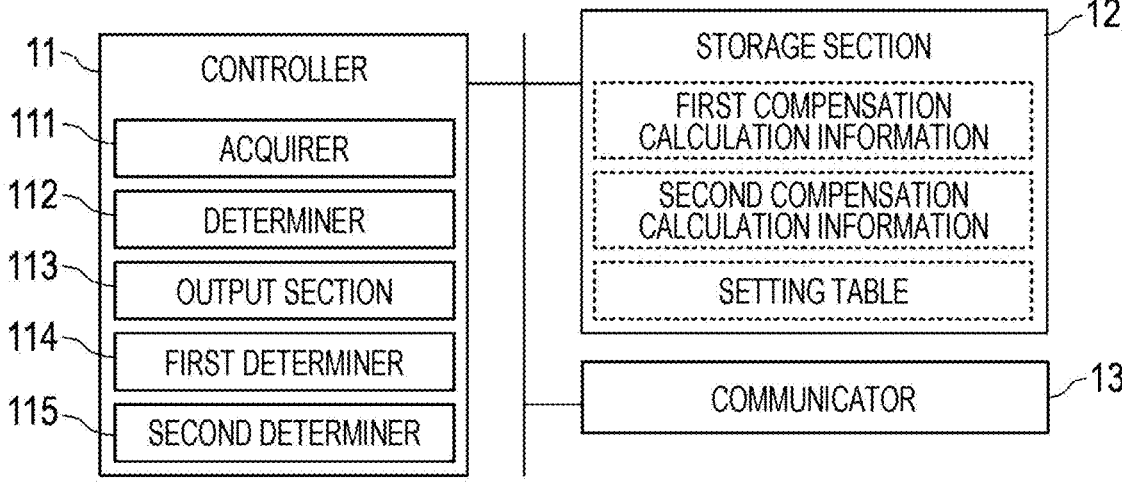
FIG. 12 is a block diagram illustrating a schematic configuration of the information processing system according to the second embodiment.

Next, an information processing system 10b according to a second embodiment will be described with reference to FIGS. 11 to 13. In the second embodiment, a determination process regarding the provision of the print information for the advertising effect measurement illustrated in FIGS. 1 to 10 is the same as that described in the first embodiment. In the second embodiment, the information processing system 10b determines compensation by using an advertising effect measured by using print information for advertising effect measurement given to a product p1. FIG. 11 is a schematic diagram illustrating a procedure of a process in a market to which the information processing system 10b according to the second embodiment is applied. FIG. 12 is a block diagram illustrating a schematic configuration of the information processing system 10b. A description of the same functional configuration as that of the information processing system 10 according to the first embodiment illustrated in FIG. 3 is omitted.

(Controller 11 and Storage Section 12)

In the second embodiment, a controller 11 functions as a first determiner 114 and a second determiner 115 in addition to functions as an acquirer 111, a determiner 112, and an output section 113. Furthermore, a storage section 12 stores first and second compensation calculation information and a setting table.

(Compensation)

A brand owner as a product user pays compensation corresponding to a printing price to a printing company as a first provider in return for provision of a product p1. The printing price is calculated based on the first compensation calculation information. The compensation calculation information is a unit price (unit sheet price) per printed sheet. The compensation calculation information may be a stepwise flat rate according to the number of printed sheets of one contracted lot.

The brand owner as the product user pays compensation corresponding to a printing price to the printing company as the first provider in return for the provision of the product p1. The printing price is calculated based on the first compensation calculation information and the number of printed sheets.

The printing company, which is the first provider, pays compensation corresponding to a click price to a printing machine manufacturer, which is a second provider, in return for providing consumables of the printing machine that has used the product for printing. Here, the click price is a price corresponding to the consumption amount (replenishment amount) of a consumable or a price corresponding to the number of printed sheets, and is calculated based on the second compensation calculation information and the consumption amount or the number of printed sheets.

In the second embodiment, the three parties, that is, the brand owner, the printing company, and the printing machine manufacturer, that is, the product user and the first and second providers, cooperate with each other as a whole to implement a procedure for creating and providing the product p1. Next, the first and second compensation calculation information is cooperatively determined by the information processing system 10b (the first and second determiners 114 and 115) as described later based on second information (the number of times of access, hereinafter also referred to as an index value) relating to the advertising effect. There may be three administrators of the information processing system 10b. In this case, the management of the information processing system 10b is performed jointly by the three parties. As another example, the management may be performed by any of the three parties. For example, the printing machine manufacturer mainly manages and operates the information processing system 10b. The administrator sets numerical values of a setting table for determining the first and second compensation calculation information in accordance with a contract with the other two parties or adjustment of the three parties in advance. In addition, the administrator selects a setting table to be applied from a plurality of setting tables in which different numerical values set in advance are described in accordance with a contract with the other two parties or adjustment of the three parties in advance.

Each of the first compensation calculation information and the second compensation calculation information is, for example, a unit price per printed sheet (also referred to as a unit sheet price), and the compensation (printing price and click price) is calculated by multiplying the unit price by the number of printed sheets. Alternatively, each of the first compensation calculation information and the second compensation calculation information may be a stepwise flat rate according to the number of printed sheets of one contracted lot.

(First and Second Determiners 114 and 115)

The first determiner 114 determines the first compensation calculation information based on the index value (second information) relating to the effect of the product. The first compensation calculation information relates to calculation of compensation to be paid by the product user (brand owner) that requests creation of the product to the first provider (printing company) that creates the product by using the image forming apparatus (digital printing machine). The second determiner 115 determines, based on the same index value, the second compensation calculation information relating to calculation of compensation to be paid by the first provider to the second provider (printing machine manufacturer) that provides a consumable to be used in the image forming apparatus.

As a specific method, the first determiner 114 determines the first compensation calculation information by using the index value acquired by the acquirer 111 and a setting table 1. The relationship between the index value and the first compensation calculation information is described in the setting table 1. For example, the setting table 1 is set such that the value of the compensation calculation information increases as the index value increases. Similarly, the second determiner 115 determines the second compensation calculation information by using the same index value acquired by the acquirer 111 and a setting table 2. The relationship between the index and the second compensation calculation information is described in the setting table 2. For example, the setting table 2 is set such that the value of the compensation calculation information increases as the index value increases. Note that the setting table 1 may store a plurality of tables having different values. The administrator (for example, the first provider) may select a desired setting table 1 from the setting tables 1 in accordance with a contract with another party (for example, a party other than the first provider) Similarly, a plurality of tables having different values may be stored in the setting table 2, and the administrator may select a desired setting table 2 from the setting tables in accordance with a contract with another party (for example, a party other than the first provider).

(Process of Determining Compensation Based on Advertising Effect)

Figure 13:
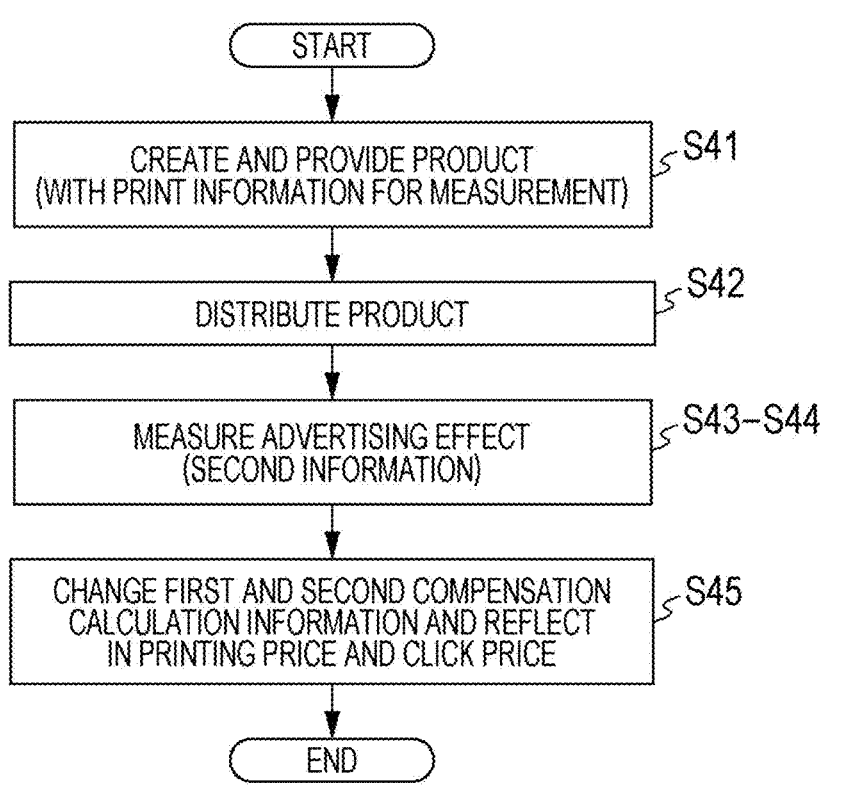
FIG. 13 is a flowchart illustrating a process of determining compensation based on an advertising effect in the second embodiment.

FIG. 13 is a flowchart illustrating a process of determining compensation based on an advertising effect in the second embodiment.

(Steps S41 to S44)

Processing in steps S41 to S44 is the same as the processing in steps S21 to S24 illustrated in FIGS. 1 and 7. The product p1 provided with the print information for measurement is generated and distributed to a customer. The customer accesses the web server 70 based on the print information (a URL or a two-dimensional code). The web server 70 counts the number of times of access, and transmits the counted number as the second information (index value) to the information processing system 10*b* in response to a request. The acquirer 111 acquires the transmitted second information (index value).

(Step S45)

As described above, the first determiner 114 of the information processing system 10*b* determines the first compensation calculation information using the index value acquired by the acquirer 111 and the setting table 1. The second determiner 115 determines the second compensation calculation information using the same index value and the setting table 2. As a result, the price is reflected, and the compensation paid from the brand owner to the printing company is an amount of money based on the revised first compensation calculation information and the number of printed sheets. Further, the compensation paid from the printing company to the printing machine manufacturer is an amount of money based on the revised second compensation calculation information and the number of printed sheets.

(Reflection Timing)

As a first example, the acquisition of the second information (the index value) is started immediately after the product p1 is created (or after the product p1 is started to be distributed from the product user to a user), and is ended before a predetermined ending period elapses. The ending period is several weeks to several months, for example, one month, from the end of the creation of the product p. For example, in the case of the number of times of access to the web page of the URL, the acquirer 111 acquires, as the index value, the total number of times of access until a time point when one month has elapsed. Then, the first and second determiners 114 and 115 determine the first and second compensation calculation information based on the index value. The payment of the compensation between the product user and the first provider and between the first provider and the second provider is performed at the printing price and the click price calculated based on the determined first and second compensation calculation information.

As a second example, there may be a case in which a contract in which delivery of products of a plurality of lots is repeatedly performed is established. In this case, for the first lot, compensation is paid in a predetermined amount of money. Then, in the second and subsequent lots, the first and second compensation calculation information for the next lot n is determined based on an index for the immediately preceding lot n−1, and is reflected when a product p1 is created in the next lot n. For example, in the second lot, compensation is determined based on the first and second compensation calculation information determined based on an index for the first lot.

As described above, the information processing system 10*b* according to the second embodiment acquires second information relating to an advertising effect of a product after the product of which the advertising effect of an advertisement can be measured is created by an image forming apparatus, the information processing system 10*b* further including: the first determiner that determines, based on the second information, first compensation calculation information relating to calculation of compensation to be paid by a product user that requests the creation of the product to a first provider that creates the product by the image forming apparatus; and the second determiner that determines, based on the second information, second compensation calculation information relating to calculation of compensation to be paid by the first provider to a second provider that provides a consumable to be used in the image forming apparatus.

Thus, the product user and the printing company actively activate the advertisement of merchandise using the product. In particular, the brand owner that is the product user pays compensation corresponding to the advertising effect to the printing company, thus making it easier to request creation of a product such as DM. Furthermore, the printing company can receive the compensation corresponding to the advertising effect, and can receive fixed compensation even if the advertising effect is low. The printing machine manufacturer that supplies consumables and the like can also reflect the compensation received by the printing company in the prices of consumables. In addition, along with this, promotion and advertisement of merchandise or the like with products are activated, and thus the number of printed sheets increases, and as a result, it is possible to receive a merit due to an increase in demand for consumables. That is, the product user and the first and second providers can avoid the risk and receive the merit.

The configurations of the information processing system 10 and 10*b* described above are main configurations for describing the features of the above-described embodiments, and are not limited to the above-described configurations and can be modified in various ways within the scope of the claims. In addition, a configuration included in a general information processing apparatus is not excluded.

FIGS. 1 and 11 illustrate an example in which the terminal device 30 is located on the printing company side, but the terminal device 30 may be located on the brand owner side. The result of the determination by the information processing system 10 is provided to the brand owner via the terminal device 30. With reference to this, the brand owner can appropriately determine whether or not to add the print information for advertising effect measurement to the product for advertising.

In addition, means and methods for performing the various processes in the information processing system 10 according to the above-described embodiment can be implemented by any of a dedicated hardware circuit and a programmed computer. The program described above may be provided by, for example, a computer-readable recording medium such as a USB memory or a digital versatile disc (DVD)-ROM, or may be provided online via a network such as the Internet. In this case, the program recorded on the computer-readable recording medium is usually transferred to and stored in a storage section such as a hard disk. In addition, the program may be provided as independent application software or may be incorporated into software of the apparatus as one function of the apparatus.

Although embodiments of the present invention have been described and illustrated in detail, the disclosed embodiments are made for purpose of illustration and example only and not limitation. The scope of the present invention should be interpreted by terms of the appended claims.

What is claimed is:

1. An information processing system comprising:
an image forming apparatus;
a computer comprising:
    an acquirer that acquires first information relating to an advertisement;
    a determiner that determines, based on the acquired first information, whether to create a product to be created by an image forming apparatus as a product on which print information for measuring an advertising effect of the advertisement is printed or as a product on which the print information is not printed; and
    an output section that outputs a result of the determination in the determiner;
the imaging formation apparatus creates the product on which print information for measuring the advertising effect of the advertisement is printed or as the product on which the print information is not printed, the print information for measurement on the product being a two-dimensional code obtained by encoding a URL; and
wherein the acquirer acquires second information relating to the advertising effect of the product after the product of which the advertising effect of the advertisement can be measured is created by the image forming apparatus and upon a user accessing the URL using the two-dimensional code printed on the product via a camera on a smartphone.

2. The information processing system according to claim 1, wherein
the print information for measurement on the product is a URL or a two-dimensional code obtained by encoding the URL, and the measurement of the advertising effect is performed by measuring access to a web page specified by the URL.

3. The information processing system according to claim 1, wherein
the first information relating to the advertisement is information relating to a distribution target person of a product for an advertisement.

4. The information processing system according to claim 3, wherein
the first information relating to the advertisement is an elapsed time from past purchase or use relating to a target of the advertisement of the product by the distribution target person, or the number of times of purchase or use relating to the target of the advertisement of the product by the distribution target person.

5. The information processing system according to claim 1, wherein
the first information relating to the advertisement is information relating to merchandise or a service to be advertised.

6. The information processing system according to claim 1, wherein
an output destination of the output section is a display section, and the result of the determination is displayed on the display section.

7. The information processing system according to claim 1, wherein
the output section has a communication function, and transmits the result of the determination to an external device.

8. The information processing system according to claim 1, wherein
the acquirer acquires second information relating to the advertising effect of the product after the product of which the advertising effect of the advertisement can be measured is created by the image forming apparatus, the information processing system further comprising:
a first determiner that determines, based on the second information, first compensation calculation information relating to calculation of compensation to be paid by a product user that requests the creation of the product to a first provider that creates the product by the image forming apparatus; and
a second determiner that determines, based on the second information, second compensation calculation information relating to calculation of compensation to be paid by the first provider to a second provider that provides a consumable to be used in the image forming apparatus.

9. A method of determining a product, the method comprising:
    (a) acquiring, by a computer, first information relating to an advertisement;
    (b) determining, by the computer, based on the acquired first information, whether to create a product to be created by an image forming apparatus as a product on which print information for measuring an advertising effect of the advertisement is printed or as a product on which the print information is not printed;
    (c) outputting, by the computer, a result of the determination in (b);
    (d) creating, by the image forming apparatus, the product on which print information for measuring the advertising effect of the advertisement is printed or as the product on which the print information is not printed, the print information for measurement on the product being a two-dimensional code obtained by encoding a URL; and
    (e) acquiring, by the computer, second information relating to the advertising effect of the product after the product of which the advertising effect of the advertisement can be measured is created by the image forming apparatus and upon a user accessing the URL using the two-dimensional code printed on the product via a camera on a smartphone.

10. A non-transitory computer-readable recording medium storing a control program for causing a computer to execute a process, the process comprising:
    (a) acquiring first information relating to an advertisement;

(b) determining, based on the acquired first information, whether to create a product to be created by an image forming apparatus as a product on which print information for measuring an advertising effect of the advertisement is printed or as a product on which the print information is not printed;

(c) outputting a result of the determination in (b);

(d) creating, by the image forming apparatus, the product on which print information for measuring the advertising effect of the advertisement is printed or as the product on which the print information is not printed, the print information for measurement on the product being a two-dimensional code obtained by encoding a URL; and (e) acquiring, by the computer, second information relating to the advertising effect of the product after the product of which the advertising effect of the advertisement can be measured is created by the image forming apparatus and upon a user accessing the URL using the two-dimensional code printed on the product via a camera on a smartphone.

* * * * *